June 9, 1964 S. J. SKINNER 3,135,994
APPARATUS FOR ADJUSTING BACK-PRESSURE IN EXTRUDERS
DURING CONTINUOUS OPERATIONS
Filed Nov. 30, 1960
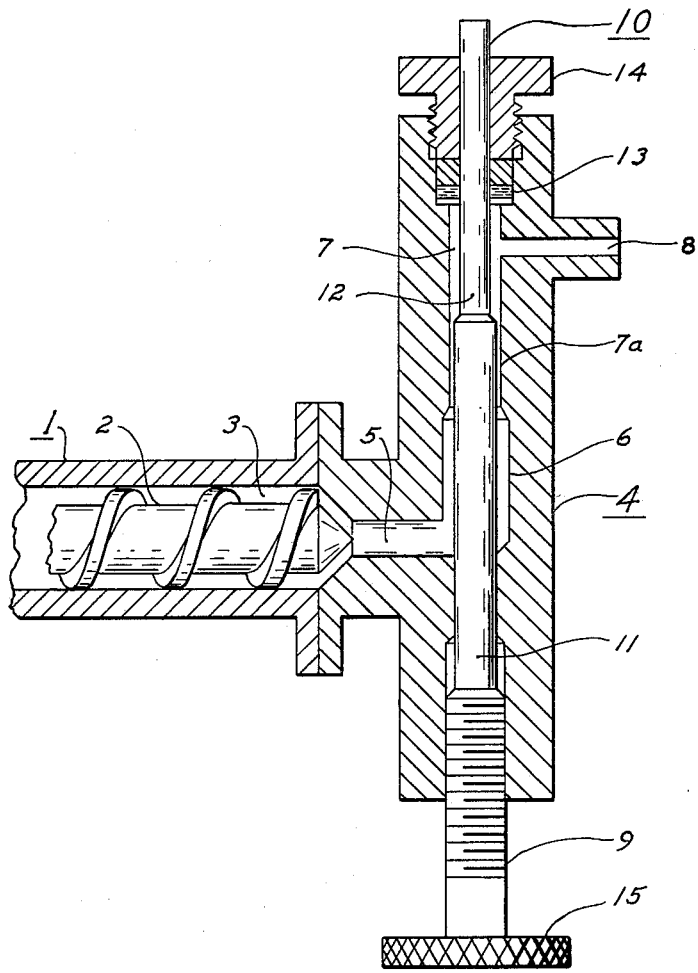
STANLEY JOHN SKINNER  INVENTOR.
BY Cornelius H. Cleary
ATTORNEY.

3,135,994
APPARATUS FOR ADJUSTING BACK-PRESSURE IN EXTRUDERS DURING CONTINUOUS OPERATIONS
Stanley John Skinner, Malpas, Newport, England, assignor to Monsanto Chemicals Limited, London, England, a British company
Filed Nov. 30, 1960, Ser. No. 72,735
4 Claims. (Cl. 18—12)

This invention relates to extruders, and particularly to extruders for use with thermoplastic synthetic resins.

In operating an extruder it is often desirable for a certain amount of back-pressure to be exerted on the screw of the extruder. This promotes mixing and refining of the synthetic resin. Some back-pressure is of course developed because of the resistance to the flow of the resin which is afforded by the die itself. This can be increased by incorporating a restriction between the screw of the extruder and the die. Several ways of doing this have been proposed. These attempts have, for the most part, however, met with difficulties in putting them into actual practice. This has been particularly so when attempts have been made to provide expedients capable of changing the amount of restriction, and thus the back-pressure, while the extruder is being maintained in continuous operation.

Accordingly, it is a principal object of this invention to provide an apparatus expedient capable of adjusting back-pressure in extruders, which does not require interrupting the extrusion operation in order to practice the same.

Other objects of the invention will in part be obvious and will in part appear hereinafter.

These and other objects of the invention are attained in an extruder for thermoplastic synthetic resins in which an annular orifice is provided between the screw and die of said extruder, the length of said annular orifice being capable of being varied or adjusted during operation of the said extruder.

It is to be understood that the expression "annular" means an area bounded by two endless lines, one of which lies wholly within the other. While the two lines are preferably concentric circles, some latitude can be practiced here. For example the orifice can have an annular cross-sectional area bounded by two ellipses.

In order to illustrate the invention, the acompanying drawings are included in which:

FIGURE I is an elevational view, partially in section and with some parts broken, of an extruder barrel incorporating a variable orifice in the head thereof.

Referring now to the drawing, an extruder barrel 1 of an extruder, otherwise not represented, having a screw 2 aligned longitudinally within the bore 3 thereof, is fitted at its discharge end with an extruder head 4. Any convenient expedient can be used to effect the fitting, provided that substantial axial alignment between bore 3 and bore extension 5 of extruder head 4 is obtained. Extruder head 4 is provided with a hollow interior such that intercommunication is provided starting with bore extension 5 through lower zone 6 then upper zone 7, and finally die mouth 8 defining the said interior. Lower zone 6 is of larger internal diameter than upper zone 7.

The lower end of extruder head 4 is tapped to receive the threaded end 9 of a solid cylindrical plunger 10. The bottom portion 11 of plunger 10 is materially longer, preferably twice the effective length, and has a larger diameter than the top portion 12 of the said plunger. The diameter of upper portion 12 is less than that of upper zone 7 of head 4 in order that when plunger 10 is positioned within head 4 an annular orifice 7a is defined between the lower portion 12 of plunger 10 and the top zone 7 of extruder head 4. The top portion 12 of plunger 10 is capable of slidable movement through composite seal 13 seated by adjustable end plate 14, the latter tapped into the top end of extruder head 4. At its low end, plunger 10 is provided with a hand-wheel 15.

The length of annular orifice 7a can be adjusted or varied, i.e., shortened or lengthened, by screwing plunger 10 in or out of the interior of extruder head 4. This is implemented through turning hand-wheel 15. As a result of this adjusting, the amount of back-pressure being applied on the softened resin during extrusion of the same, is also varied. The greater the length of annular orifice 7a the greater the back-pressure provided on the resin.

The above arrangement can be subjected to adaptations, as for instance in the position of the extruder head 4 as a whole in relation to screw 2, or the planar position of the plunger 10, which latter can for example be inclined at only 45° to the line of the screw instead of 90° as shown. Again, plunger 10 can be positioned in axial alignment with screw 2. Preferably annular orifice 7a is positioned as close as possible to the terminal end of screw 2. Plunger 10 can be made interchangeable with other plungers of the same general design in order to vary the cross-sectional size of annular orifice 7a and obtain a different range of back-pressures. Then too, instead of resorting to manual operation of plunger 10 in the manner described, the same can be designed to be automatically controlled.

The cross-sectional area of annular orifice 7a bears relationship to the range of back-pressures which it is desired to obtain, as well as on the type of resin being extruded and its rate of flow. Thus, a larger area is needed when extruding resins such as toughened polystyrenes (polystyrene modified by the incorporation before or after polymerisation of a natural or a synthetic rubber, for example a styrene/butadiene rubber), which have a high resistance to flow than is needed when extruding a material like nylon where the resistance to flow is much lower. Also, where the flow-rate is high, as for example, when it is 900 pounds per hour, the cross-sectional area should normally be larger than when the flow-rate is low, as for example when it is only up to 20 pounds per hour. In general, cross-sectional areas of from 0.005 square inch to 0.2 square inch and more specifically 0.01 square inch to 0.1 square inch, can be used to advantage, although in large extruders having very high flow-rates it may be useful to employ an orifice having a greater cross-sectional area, for example up to 0.3 square inch or even 0.5 square inch. An area between 0.01 and 0.05 square inch, such as 0.03 square inch operates quite well in medium-sized extruders.

The length of annular orifice 7a is also dependent upon several factors, and is particularly reliant on the maximum amount of back-pressure which is desired for a particular operation. For a medium-sized extruder, that is, one provided with an annular orifice whose cross-sectional area is about 0.03 square inch, it is often desirable for the length to be variable from zero up to about 8 inches, for instance in the range of about 0.5 inch to about 4 inches.

The cross-sectional width of annular orifice 7a (that is its radial width, if and where it is circular) depends on considerations similar to those used in deciding on the cross-sectional area. Thus, a narrow width is prescribed where the back-pressure desired is high, or where the flow resistance of the extruded resin is low. In general, widths from 0.001 inch to 0.02 inch can be employed; and excellent results can be obtained in the extrusion of toughened polystyrene at 14 pounds per hour through a circular annular orifice having a radial width of 0.002 inch, while an annular orifice having a radial width of 0.01 inch is well suited for extruding the same material at 900 pounds per hour.

As well as being employed to control the degree of refining to which a resin is subjected, extruders utilizing the expedient presently featured can be used to effect the dispersion into a synthetic thermoplastic resin of additives and like components. Examples of these include pigments, fillers, etc.

In practice, the extruder is operated in a usual manner, and in addition, the back-pressure on the screw is adjusted as much as is necessary so that the appropriate degree of refining or mixing is obtained during the extrusion operation. The back-pressure can for example be maintained through adjustment to the minimum value which will achieve the degree of the refining or mixing which is required. This has the effect of minimising the power required for the extrusion operation.

An important application of extruders improved in the manner of the invention is the extrusion of finished sections to a high degree of precision. By appropriate adjustment of the length of the annular orifice there can be obtained a very close control of the rate of flow of the extruded resin. The use of a servo-mechanism to ensure a constant flow-rate is particularly advantageous in this application.

The extruder which results from practice of the present invention can be employed to advantage in the extrusion of a wide variety of thermoplastic resins. For example, it is particularly useful in refining toughened polystyrene, but can also be used in the extrusion of polyethylene, polypropylene, polyvinyl chloride, nylon, polymethyl methacrylate, polycarbonates, and cellulose derivatives such as cellulose acetate.

The invention is illustrated by the following example.

*Example I*

This example describes the extrusion of a toughened polystyrene (that is a polystyrene modified by incorporation of a synthetic rubber) using an extruder according to the invention.

A one-inch extruder fitted with an extruder head constructed as shown in the accompanying drawing is used to extrude a continuous cylindrical rod of toughened polystyrene ¼ inch in diameter. The inside diameter of the upper zone of the extruder head is 0.750 inch, and the outside diameter of the plunger lower portion is 0.730 inch, so that the radial clearance defining an annular orifice, between the two is 0.010 inch. The plunger is capable of being advanced into the extruder head to a maximum depth of 2 inches. Movement of the plunger, controlled by the hand-wheel, is used to alter length of the annular orifice and as a result the back-pressure developed on the extruder screw.

It is found that smooth and accurate control of the back-pressure is possible throughout the complete range of pressures between 200 pounds per square inch (when the lower portion of the plunger is completely withdrawn from the upper zone of the extruder head) and 6,000 pounds per square inch (when the plunger is adjusted so that its lower portion occupies 1½ inches of the upper zone of the head, that is the annular orifice is 1½ inches in length). It is also found that the thickness of the extruded rod could be held constant by making occasional adjustments to the hand-wheel.

The degree of refining obtained by operating the extruder with the plunger in a certain position can be assessed by chopping the extruded rod so obtained into pellets about ⅛ inch long, extruding the pellets again into a 1/16 inch thick sheet (using a conventional extruder fitted with a suitable sheeting die), and observing the quality of the surface finish of the sheet.

As a result of changing the length of the annular orifice while the extruder is in operation a number of times, and, examining the quality of toughened polystyrene sheet which results, it can be determined that an annular orifice length of 1½ inches gives a surface finish that is excellent. At the same time the extruder operates efficiently. As a result too it can be determined that operating with the annular orifice longer than 1½ inches will result in unnecessary power consumption, while with an orifice length shorter than 1½ inches less than excellent surface finishes result on the sheet.

It will thus be seen that the objects set forth above, among those made apparent from the preceding description, are efficiently attained, and, since certain changes can be made in carrying out the above method and in the construction set forth without departing from the scope of the invention, it is intended that all matter contained in the above description and shown in the accompanying drawing shall be interpreted as illustrative and not in a limiting sense.

What is claimed is:

1. An apparatus for adjusting back-pressure in an extruder without interrupting extrusion operation comprising, in combination, a bore defined by an elongated casing having an inlet adapted to be fitted to the discharge end of an extruder and an outlet, and a solid cylindrical plunger slidably mounted within said bore at positions (1) below said inlet to the bore and (2) above said outlet by sealing means, said cylindrical plunger having a larger diameter along the portion adjacent the inlet to said bore, than along the portion adjacent the outlet from said bore thereby defining two co-extensive annular orifices having different cross-sectional areas between said plunger and said casing, the lengths of which are varied by movement of said plunger axially whereby the back-pressure in the extruder and the degree of material refining is controlled during extrusion operation.

2. The apparatus according to claim 1 wherein the portion of the bore connecting and adjacent the inlet to said bore has a larger cross-sectional area than the portion connecting and adjacent the outlet from said bore.

3. The apparatus according to claim 2 wherein the annular orifice defined between the portion of the bore having the smaller cross-sectional area and the portion of the cylindrical plunger having the larger diameter has a cross-section area of 0.05 square inch to 0.2 square inch.

4. An apparatus according to claim 2 wherein the length of the annular orifice which is defined between the portion of the bore having a smaller cross-sectional area and the portion of the cylindrical plunger having the larger diameter is capable of being varied within a range of up to about eight inches.

References Cited in the file of this patent

UNITED STATES PATENTS

| | | |
|---|---|---|
| 2,461,282 | Jobst | Feb. 8, 1949 |
| 2,566,854 | Rhodes | Sept. 4, 1951 |
| 2,626,427 | Brown | Jan. 27, 1953 |
| 2,865,050 | Strauss | Dec. 23, 1958 |
| 2,878,515 | Strauss | Mar. 24, 1959 |
| 2,938,756 | Loeb | May 31, 1960 |
| 2,952,041 | Bernhardt | Sept. 13, 1960 |
| 2,972,359 | Joukainen et al. | Feb. 21, 1961 |
| 3,019,481 | Negoro | Feb. 6, 1962 |
| 3,029,062 | Thomas | Apr. 10, 1962 |
| 3,050,084 | Palfey | Aug. 21, 1962 |

FOREIGN PATENTS

| | | |
|---|---|---|
| 219,203 | Australia | Nov. 27, 1958 |

OTHER REFERENCES

Sackett article, "Speaking of Extrusion," SPE Journal, November 1957, pages 49–51.